United States Patent [19]

Ceintrey

[11] 4,296,167

[45] Oct. 20, 1981

[54] COMPOSITIONS FOR USE IN SEAL COATS

[76] Inventor: Marcel Ceintrey, Anse de Kerjegu, 29120 Combrit, France

[21] Appl. No.: 128,750

[22] Filed: Mar. 10, 1980

Related U.S. Application Data

[63] Continuation-in-part of Ser. No. 64,742, Aug. 8, 1979, abandoned.

[30] Foreign Application Priority Data

Aug. 18, 1978 [FR] France ............................... 78 24231

[51] Int. Cl.$^3$ ............................................... B32B 7/00
[52] U.S. Cl. ..................................... 428/284; 404/82; 427/202; 427/203; 427/204; 428/141; 428/143; 428/150; 428/286; 428/287; 428/354; 428/423.1; 528/45; 528/73
[58] Field of Search ..................... 528/45, 73; 427/202, 427/203, 204; 404/82; 428/141, 143, 150, 284, 286, 287, 354, 423.1

[56] References Cited

U.S. PATENT DOCUMENTS 4,101,497 7/1978 Charves .......................... 260/31.2 N
4,134,866 1/1979 Tominago et al. ............. 260/18 PN

FOREIGN PATENT DOCUMENTS 1399257 7/1975 United Kingdom .
1279601 6/1976 United Kingdom ................ 427/203

*Primary Examiner*—James J. Bell
*Attorney, Agent, or Firm*—Lawrence Rosen

[57] ABSTRACT

A seal coat for use in a traffic surface is formed by reacting a first component comprising a liquid epoxy resin and a blocked polyisocyanate prepolymer with a second component comprising an aliphatic or cycloaliphatic polyamine, and allowing the mixture to cure. Advantageous results are achieved if the mixture, before curing, is allowed to impregnate a matrix, e.g. a non-woven synthetic material.

11 Claims, No Drawings

COMPOSITIONS FOR USE IN SEAL COATS

CROSS-REFERENCE TO RELATED APPLICATION

This application is a continuation-in-part of my co-pending Application Ser. No. 064,742, filed Aug. 8, 1979, now abandoned.

DESCRIPTION OF THE INVENTION

This invention relates to binder compositions of the type which can be used to form seal coats having water-, and particularly salt water-, oil-, and wear-resistant properties. One example of the use of such coats is in sealing concrete works or metallic structures, particularly of orthotropic slabs.

The problems inherent in providing such coats are familiar to those skilled in the art, and no satisfactory solution has yet been provided with respect to both the seal coats and their wearing properties. Known solutions in the case of sealing steel and concrete may be classified into two classes, the first being to use adhesive seal coats, generally comprising heat-curable epoxy resins, and the second being to use non-adhesive, so-called "independent" seal coats, generally comprising asphalt or bituminous materials. Both types of seal coats are often provided with a bituminous concrete upper layer which function as a wearing course. Both the above classes of seal coats have their specific drawbacks, for example in the creeping of the bituminous coating over the seal coat layer (particularly in the case of seal coats comprising an epoxy film adhering to the coated structure); in the deformation of the seal coat layer under stress (when using independent asphalt layers which do not adhere to the structure); in the formation of blisters between the application of the seal coat and the application of the wearing course (this is frequently the case with asphalt seal coats); and in the cracking of the seal coat, particularly at low temperatures.

This last drawback is frequently common to both types of seal coats because they become highly rigid at low temperatures and, in the case of asphalt, because the independence of the asphalt layer from the structure is more theoretical than actual, the frictional forces frequently exceed the tensile strength of the asphalt layer. In this latter case, loss of the sealing capacity is all the more serious. For example, the water may flow under the seal coat and reach all the cracks in the structure.

In the case of the seal coats comprising a film of epoxy resin, the difference in degree of expansion of the too highly rigid resin film and the weaker concrete skin can cause stripping and cracking of the latter.

Finally, bituminous coatings are often unsatisfactory. If compact, such coatings tend to distort under localised stress; if less compact, water may penetrate and concentrate at the interface of the seal coat and the wearing course, causing destruction of the latter.

British Patent Specification No. 1,418,493 discloses a seal coat comprising a plastics layer coated on both faces with a glass-fibre reinforced layer and, externally, a bituminous layer. French Patent Publication No. 2,321,013 discloses an elastic sheet reinforced on both faces with a non-woven material and adhered to the structure to be coated with a bituminous or tar binder. Both these types of seal coat suffer from two main disadvantages. The first lies in the difficulty of adhering lengths of material, particularly over curved structures such as bridges. The second lies in the difficulty of achieving adhesion along banking on the edges of structures to be coated.

British Patent Specification No. 1,509,108 discloses a seal coat intended for use as an "all-weather" sports ground wear surface. The coat is obtained by mixing a binder with a resilient material, the binder being prepared, just before use, from (A) a prepolymer of a polyurethane having at least two terminal isocyanate groups which are each blocked by a phenol and (B) a liquid polyamine.

A novel binder composition suitable for use as or as part of a seal coat has now been discovered. The composition comprises the reaction product of a first component comprising a liquid epoxy resin and a blocked polyisocyanate prepolymer, with a second component comprising an aliphatic or cycloaliphatic polyamine. The components may be formulated separately, to be mixed at the time of use.

A seal coat of this invention may comprise a cured binder composition as defined or a matrix impregnated with such a composition.

A method of forming a seal coat on a structure according to the invention, which provides a particularly preferred seal coat, comprises spreading a binding layer over the structure; applying a matrix over the binding layer; and spreading a layer of a binder composition of the invention over the matrix, thereby impregnating the matrix.

On concrete structures, the adhesion of some coatings can be impaired by the moisture present and, in these circumstances, the binding layer advantageously consists of an aqueous epoxy resin emulsion which may be spread in an amount of 400 to 800 g/m$^2$. The epoxy resin impregnates the concrete and reinforces its surface, provides good adhesion, and constitutes an adhesive layer for the subsequently applied matrix. On metallic structures, however, an epoxy emulsion need not be used and the binding layer may consist of a binder composition of the invention, e.g. in an amount of 700 to 1500 g/m$^2$.

The method of this invention can provide an adhesive seal coat which prevents the potential flow of water under the sealing surface, which is capable of transmitting stress to the coated structure and which, with the optional addition of coal tar pitch, at low temperatures ($-20°$ C.), can exhibit an elongation in excess of 50% (ISO). At the same temperature the elongation for the epoxy resins used hitherto is too small to be measured.

When it is desired to obtained particularly good sealing and reinforcing properties, an already applied coating layer may be covered with an additional matrix, followed by another binding layer, e.g. of the novel binder composition. The matrices are preferably applied mutually orthogonally.

If used, the matrix will usually be fibrous and is preferably a non-woven material, suitably of synthetic fibres, e.g. polyester, polypropylene or polyamide. A non-woven matrix preferably has a weight of 80 to 200 g/m$^2$ and preferably exhibits an elongation at break in excess of 40% in all directions. The amount of the impregnant, i.e. the binder composition, is preferably from 1.5 to 2.5 kg/m$^2$. When an impregnated non-woven material is used in a seal coat of the invention, it can reinforce the seal coat and substantially increase its tear strength and its fatigue strength, absorb the stresses arising from differences in expansion between the resin and concrete and prevent perforation of the resin film by the sand and aggregates which may be spread over the resin surface prior to its final polymerisation.

Prior to polymerisation of the binder composition of the invention, when used as a seal coat or as an impregnant in a matrix-reinforced seal coat, aggregrates may be spread over the incompletely cured binder layer. If no subsequent wearing course is to be provided, aggregates having a particle size of 2 to 10 mm may be spread in an amount of 5 to 8 kg/m$^2$. If a wearing course is to be used, aggregates having a particle size of 0.5 to 3 mm may be spread in an amount of 3 to 6 kg/m$^2$. Inorganic aggregates, preferably a mixture of sand and crushed gravel, may be used.

The first component of the binder composition of the invention may consist of, for example, 15 to 50% by weight of a conventional liquid epoxy resin, e.g. of the type commercially available under the trade name Epikote 828 or DX 214 (Shell) or DER 7475 (Dow Chemical); and 85 to 50% by weight of a polyisocyanate prepolymer comprising phenol-blocked isocyanate groups. The purpose of the phenol-blocking is to make the product insensitive to humidity, which is obviously of fundamental importance in the production of seal coats used in the open.

Examples of suitable polyisocyanates are prepolymers of toluene diisocyanate or diphenylmethane diisocyanate and polyethers, preferably straight-chain polyethers, having a molecular weight of 600 to 2500, based on polyoxypropylene, polyoxybutylene or copolymers of polyoxypropylene and polyoxybutylene with polyoxyethylenes. The proportions of polyether and of diisocyanates are preferably such that, after the reaction, the free NCO group content is 1.5 to 6% by weight prior to blocking with a phenol.

It is well known to those expert in the art that the variety of possible chains is practically infinite. The desired selection will be governed by workability considerations, particularly with respect to the viscosity of the product obtained after blocking. Viscosities between 3,000 and 20,000 cps at 20° C. are preferred because they permit ready processing under the described conditions.

Examples of suitable phenols are phenol itself, cresols and tert-butylphenol.

If desired, plasticisers such as dibutyl phthalate, butyl adipate, octyl adipate, petroleum-derived plasticisers such as Dutrex (Shell) may be included in the first and/or the second component of the binder composition. The preferred amount of plasticiser is from 5 to 20% by weight, based on the total weight of the binder.

The second component of the novel binder composition comprises an aliphatic or cycloaliphatic polyamine such as trimethylhexamethylenediamine, N-(2-aminoethyl)piperazine, isophorone diamine, bis(4-aminocyclohexyl)methane or 3,3'-dimethyl-4,4'-diaminodicyclohexylmethane. Such amines have as their chief feature that, at ambient temperatures, not only do they react with the epoxy resin, but also they displace the phenol to give what may be designated a polyureide. This is a basic characteristic of the invention because, when the binder composition is spread as a relatively thin film over large surfaces of several hundreds of square meters, heating of the resin to cause polymerisation would be undesirable and expensive; it is therefore important that polymerisation should proceed at ambient temperatures.

The amount of the polyamine should be substantially stoichiometric with respect to the total amount of the epoxy resin and the polyisocyanate prepolymer of the first component. This amount, for the preferred relative weights of epoxy resin and polyisocyanate given above, is usually from about 7 to about 20% by weight of the total weight of the epoxy resin plus polyisocyanate prepolymer.

Extenders may be added to the second component in order to reduce cost while improving the wettability of concrete, steel and non-woven material surfaces. Suitable extenders include, for example, coal tar pitch and colourless coumarone-, indene- and coumarone-indene-based resin pitch, e.g. commercially available materials such as Necires EXPL (Cindu Neville Chimie).

The preferred amount of any extender(s) in the second component is from 10 to 100% by weight of the total weight of binder, i.e. of the two components. Coal tar pitch is generally the preferred extender, in view of its cost and wetting and water-proofing properties.

A variety of inorganic fillers may be included in the second component. Example of such fillers are limestone and siliceous fillers capable of passing through a 100 mesh screen. The amount of such fillers may be up to 40% by weight of the total weight of the binder composition, provided that the amount does not result in a viscosity increase up to a level which would make the composition difficult to use. The inorganic fillers may, if desired, be added on the work site, after mixing the first and second components.

It has been found that a resin formulation of the type described can not only exhibit the same utility and workability as conventional epoxy resins, e.g. excellent resistance to humidity, polymerisation at room temperature, used in liquid form and excellent adhesion to concrete but also superior mechanical strength and superior elongation at break at low temperatures, while retaining good tensile strength at high temperatures. The formulations of the type described can provide tensile strengths in excess of 20 Bars at 25° C., and elongations at break in excess of 50% at −10° C. Adhesion to concrete is limited only by the tensile strength of the concrete surface.

The following two Examples illustrate the invention. The subsequent test is comparative. All parts and percentages are by weight, unless otherwise specified.

EXAMPLE 1

On the superstructure of a concrete bridge which had been vigorously cleaned with a brush, 400 g/m$^2$ of an aqueous epoxy resin emulsion obtained by admixture of 300 g water and 100 g of a 50:50 mixture of Eurepox 716 and Euredur 429 (trade names for a resin and curing agent sold by Schering) were applied.

When the resulting film began to clear, a non-woven polyester web having a weight of 120 g/m$^2$ (sold as Bidim by Rhone-Poulenc) was applied over the still sticky resin. A second resin was then immediately applied in an amount of 2 kg/m$^2$.

The second resin comprised two components, the first component consisting of 100 parts Epikote DX 214 resin (Shell) and 100 parts of a prepolymer of toluene diisocyanate and polyoxypropylene-based polyether containing 3.5% tert-butylphenol-blocked NCO groups, and the second component of 150 parts coal tar pitch (viscosity 30° EVT) and 26 parts N-(2-aminoethyl)piperazine.

The binder obtained after polymerisation had an elongation at break of 60% at −10° C. and a tensile strength of 40 Bars at 20° C.

4 kg/m² of 0.5/3 mm sand were sprayed over the coating prior to complete polymerisation of the resin.

EXAMPLE 2

Over the concrete bed of a nuclear power plant adapted to accomodate the tank of a reactor, previously scraped with a percussion device, 600 g/m² of an epoxy resin emulsion comprising 100 g DET 331 resin (Dow Chemical) and 100 g Casamide 350 (Akzo) and 400 g water were applied.

When the film cleared, a non-woven material of the same type as in Example 1 was applied and, immediately thereafter, 2.5 kg/m² of a second resin; before completion of the polymerisation, the process was repeated by cross-wise application of lengths of the non-woven material and new applications of 2.5 kg/m² of the second resin, to give a coating having good properties.

The second resin comprised two components, the first component consisting of 30 parts DER 7475 epoxy resin (DOW) and 70 parts liquid prepolymer having a molecular weight of about 2000, obtained by reaction of toluene diisocyanate with polypropylene glycol containing 3% phenol-blocked isocyanate groups, and the second component of 15 parts bis(4-aminocyclohexyl)methane, 45 parts EVT 30°tar and 5 parts dibutyl phthalate.

50 parts dry siliceous filler were added to the mixture of the two components before spreading the resulting mixture. In this Example, it was unnecessary to spray sand over the surface of the resin.

The mixture of the two components had a tensile strength of 40 Bars at 20° C. and an elongation at break of more than 200% at −10° C. and of more than 100% at −20° C.

COMPARATIVE EXAMPLE

A conventional epoxy resin formulation was made up from 50 parts DX 214 resin (Shell), 40 parts 30°EVT pitch and 10 parts N-(2-aminoethyl)piperazine. This resin had a tensile strength of more than 25 Bars at 20° C.; however, the elongation at break was less than 5% at 0° C. and not measurable at −10° C.

A sealing coat of this invention on a concrete block was tested by suitable apparatus to an ultimate tensile strength test which produced a crack in the concrete. No break-down of the seal coat for a 1.8 mm crack was observed and opening and closing the crack 1000 times failed to cause break-down of the seal coat, at a temperature of 0° C. When the same test was conducted with the comparative Example, break-down occurred for a 0.6 mm crack and, at 0° C., five opening and closing cycles of an 0.4 mm crack were sufficient to break the film.

Throughout the preceding description, bracketted names indicate the source of trade-named materials.

It will be understood that, for use in the present invention, the polyamine must comprise labile hydrogen atoms which can displace the phenol blocking group. Usually, therefore, it comprises two primary or secondary amine groups and the nature of the components of the formulation is such that the displacement can occur at 0° to 100°, e.g. 5° to 50° and usually 8° to 40°, °C. For ease of use, the components of the formulation of the present invention are liquid.

The amount of any filler comprised in the second component may be up to a maximum of 60% by weight of the binder composition.

While particular embodiments of this invention are described above, it will be understood that the invention may be varied and modified without departing from its broader aspects, as defined in the following claims.

I claim:

1. Seal coat for a structure comprising: (a) a binding layer deposited on said structure; and (b) a reinforcement layer comprising a non-woven material of synthetic fibres impregnated with a binder comprising a complex of a modified epoxy resin and a polyureide, which is the reaction product of a first component comprising a liquid epoxy resin and a blocked polyisocyanate prepolymer, with a second component comprising an aliphatic or cycloaliphatic polyamine, said binder covering the surface of said seal coat.

2. A seal coat according to claim 1 in which the first component contains from 15 to 50% by weight epoxy resin and from 85 to 50% by weight blocked isocyanate prepolymer, the prepolymer comprising from 1.5 to 6% by weight thereof, before blocking, of isocyanate groups.

3. A seal coat according to claim 1 in which the polyamine is present in a substantially stiochiometric amount with respect to the first component.

4. A seal coat according to claim 1 in which the non-woven synthetic fibrous material has a weight of from 80 to 200 g/m² and an elongation of break in excess of 40% in all directions.

5. A traffic surface including a seal coat according to claim 1.

6. A method for forming a seal coat on a structure, which comprises spreading a binding layer over the structure; applying a matrix of a non-woven material over the binding layer; and spreading a layer of an uncured mixture as defined in claim 1 over the matrix, thereby impregnating the matrix; and curing the mixture.

7. A method according to claim 6 for forming a seal coat on a concrete structure, in which the binding layer comprises an aqueous epoxy resin emulsion which is spread in an amount of from 400 to 800 g/m².

8. A method according to claim 6 in which the binding layer comprises a mixture as defined in claim 1.

9. A method according to claim 6 in which the matrix is as defined in claim 1.

10. A method according to claim 6 in which an inorganic aggregate is spread over the coat prior to curing.

11. A seal coat formed by a method according to claim 6.

* * * * *